3,119,867
AMINO, NITRO-PHENYL-BIGUANIDES AND
AMINO, NITRO-PHENYL; GUANYL-UREAS
Hans Z. Lecher, Plainfield, N.J., Walter H. Brunner, Easton, Pa., and Franz Pum, Stamford, Conn., assignors to Clairol Incorporated, New York, N.Y., a corporation of Delaware
No Drawing. Filed Jan. 26, 1962, Ser. No. 169,138
10 Claims. (Cl. 260—553)

This invention relates to novel nitro-p-phenylene diamine derivatives, dyeing compositions and methods for dyeing animal fibers by the use of the novel derivatives.

The novel p-phenylene diamine derivatives of this invention can be represented by the following generic formula:

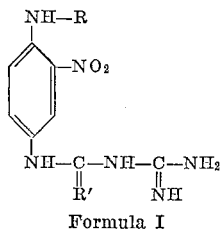

Formula I wherein R represents hydrogen, a (lower) alkyl radical or a mono- or polyhydroxyl substituted (lower) saturated aliphatic hydrocarbon radical; and R' is oxygen or the imino radical. The novel p-phenylene diamine derivatives of Formula I are also referred to herein as the biguanide derivatives when R' is the imino radical (=NH) and as the guanylurea derivatives when R' is oxygen. The term "lower" as used herein to describe an alkyl, or aliphatic hydrocarbon radical denotes such a radical having from 1 to 6 carbon atoms and preferably from 1 to 4 carbon atoms.

Illustrative of (lower) alkyl radicals as represented by R of the above generic formula there can be mentioned: methyl, ethyl, propyl, isopropyl, butyl, pentyl, and hexyl. Illustrative of hydroxyl substituted (lower) aliphatic saturated hydrocarbon radicals as represented by R of generic Formula I there can be mentioned those which are substituted with from 1 to about 3 hydroxyl radicals such as: 2-hydroxyethyl; 3-hydroxypropyl; 2,3-dihydroxypropyl; 4-hydroxybutyl and the like.

Illustrative of specific novel compounds represented by Formula I there can be mentioned:

(1)

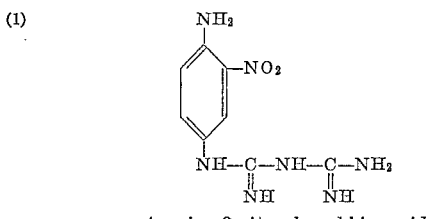

4-amino-3-nitrophenyl-biguanide (2)

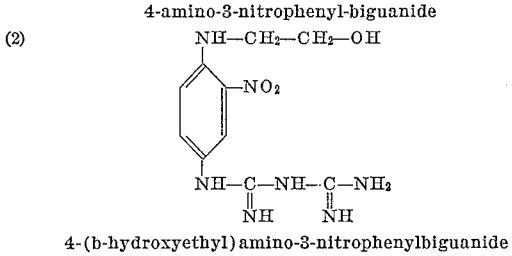

4-(b-hydroxyethyl) amino-3-nitrophenylbiguanide (3)

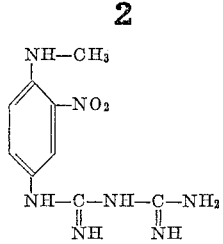

4-methylamino-3-nitrophenyl-biguanide; and (4)

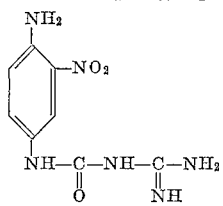

4-amino-3-nitrophenyl-guanylurea

In addition to the above specifically illustrated compounds of generic Formula I, there can also be mentioned: 4 - ethylamino - 3 - nitrophenyl - biguanide; 4 - propylamino - 3 - nitrophenyl - biguanide; 4 - butylamino - 3 - nitrophenyl - biguanide; 4 - (3' - hydroxypropyl)amino - 3 - nitrophenyl - biguanide; 4 - (2',3'-dihydroxypropyl)amino - 3 - nitrophenyl - biguanide; 4 - (4' - hydroxybutyl)amino - 3 - nitrophenyl - biguanide; 4 - methylamino - 3 - nitrophenyl - guanylurea; 4 - (b-hydroxyethyl)amino - 3 - nitrophenyl - guanylurea; and the like.

The biguanide derivatives of generic Formula I can be produced by reacting a mixture of dicyandiamide with an aqueous acidic solution of the corresponding nitro-p-phenylene diamine also referred to herein as Formula II compounds. The reaction of dicyandiamide with the nitro-p-phenylene diamine can be illustrated by the following equation:

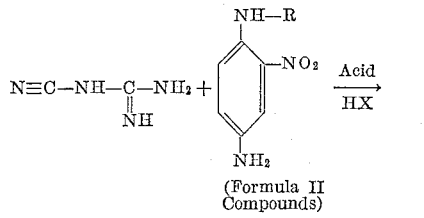

(Formula II Compounds)

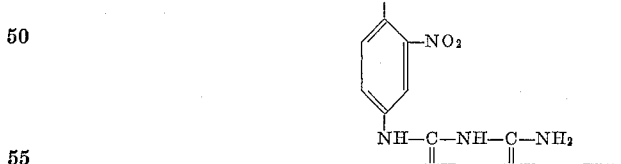

wherein R represents the same substituents as in generic Formula I, namely hydrogen, a (lower) alkyl or a hydroxyl substituted (lower) saturated aliphatic hydrocarbon radical, e.g. a hydroxyalkyl, and X represents a halogen such as chlorine or bromine. It is preferred to employ a molar excess such as about 2 moles of the dicyandiamide per mole of the nitro-p-phenylene diamine in the above reaction. The quantity of acid employed is preferably from 1 to 2 moles, based on the p-phenylene diamine reactant. The reaction temperature is preferably maintained at about 100° C. Reaction times preferably vary from about 6 to 12 hours depending mainly on the reaction temperature and the reactants employed.

The reaction of dicyandiamide with the nitro-p-phenylene diamine reactants proceeds in high yields to form the novel biguanide derivatives of generic Formula I. These biguanides can be worked up or purified by conventional purification methods, the preferred method varying with the properties of the product. Thus effective purification methods include fractional crystallization from solvents, solvent extraction, chromatographic absorption, and the like. It is preferred that the acid addition salt of the product be converted to the free base as an initial step of working up and purifying the product. The acid addition salt can be converted to the free base by the aid of a strongly alkaline material such as ammonia or an alkali metal hydroxide, e.g. sodium hydroxide.

The nitro-p-phenylene diamine compounds of generic Formula II which are reacted with dicyandiamide to produce the biguanides of generic Formula I can be produced by the reduction of a 1-amino-2,4-dinitrobenzene to the corresponding 1-amino-2-nitro-4-aminobenzene (nitro-p-phenylene diamine of Formula II). The 1-amino radical can be the primary amine or one of the secondary amino radicals of Formula I. One process for the reduction of the 1-amino-2,4-dinitrobenzene to the corresponding 1-amino-2-nitro-4-aminobenzene is by introducing about 3 moles of hydrogen into a hydrogenation apparatus maintained at about 25° C. to 70° C. and 2 to 3 atmospheres of pressure and containing a mixture of (a) a solution of about 1 mole of a 1-amino-2,4-dinitrobenzene in a (lower) alkyl alcohol, e.g. ethanol or isopropanol; (b) a catalytically effective quantity of platinum or palladium; and (c) about 2 moles of an aqueous solution of a strong inorganic acid such as hydrochloric or sulfuric acid, e.g. a 50% solution of $H_2SO_4$ in water, to give a strong acid reaction mixture. The hydrogenation can be carried out in less than one hour to produce the acid addition salt of the 1-amino-2-nitro-4-aminobenzene. The acid addition salt can then be reacted with an alkaline material to produce the free base form of the amino compound by the conventional methods well known in the art. Acid hydrolysis of the biguanide derivatives produces the acid addition salt of the corresponding guanylurea derivatives which can be converted to the free base form by conventional techniques. Illustratively, 6 normal hydrochloric acid containing about 10%, by weight, of a biguanide derivative can be boiled for about 2 hours to produce the hydrochloride salt of the corresponding guanylurea derivative. Boiling for prolonged periods such as 8 hours under these conditions causes decomposition of the guanylurea derivative. The hydrochloric acid addition salt of the guanylurea crystallizes out of the acidic solution upon cooling to room temperature. This salt can then be converted to the free base by the aid of an alkaline material such as ammonia.

The novel nitro-p-phenylene diamine derivatives of this invention, and particularly the biguanide derivatives have utility for dyeing animal fibers such as silk, furs, wool, bristles, feathers, and hair. Also, they can be used as intermediates for the preparation of other dyes. They have good affinity for animal fibers and particularly for keratinaceous fibers. The affinity for animal fibers manifests itself even at room or body temperatures. This is a particular advantage in the dyeing of hair on the human head which is the preferred use of the novel compounds of this invention. The affinity for fibers at low temperatures is also particularly advantageous for dyeing wool since dyes for wool usually require temperatures of at least 80° C. Additional advantages for use of the novel nitro-p-phenylene diamine derivatives as dyes include production of bright and lusterous orange shades on animal fibers without the need for conventional peroxide additives, e.g. hydrogen peroxide for color formation or fixation to animal fibers, good dyeing union with normal, bleached and permanently waved hair, sufficient water solubility at room temperatures so that solubilizing agents such as (lower) aliphatic alcohols and the like need not be employed, and the elimination of added alkalizing agents in dyeing at a pH of 7 to about 10 since these dyes in aqueous solution exhibit such pH values although the preferred compositions contain the additional alkalizing agents.

The dyeing compositions of this invention comprise neutral or alkaline aqueous solutions of the novel nitro p-phenylene diamine derivatives. In addition to the water and dye, the compositions can also contain the conventional ingredients found in dyeing compositions such as alkalizing agents, thickeners, detergents, gums and the like. The pH of the dyeing compositions can vary over a fairly broad range such as that of from about 7 to about 11. In the preferred compositions an alkalizing agent is added to maintain the compositions at a pH range of about 8 to 10.

The dyeing compositions of this invention can be applied to animal fibers by the conventional techniques, at the conventional temperatures or even at lower temperatures than is conventional in some practices, and for the conventional periods of time. Illustratively, when applied to living hair on the human head the compositions can be poured on the hair and permitted to remain on the hair for about 5 minutes to about 2 hours and preferably about 15 minutes to about 60 minutes at temperatures which can vary from about 20° C. to about 50° C. and preferably at temperatures from about 20° C. to about 40° C.

Any water-soluble alkalizing agent that will not interfere (i.e. is compatible) with the dye employed, and will not precipitate the dye or introduce any possibility of toxicity under the conditions of use, or injure the scalp or hide of the pelt, at its ultimate concentration in the composition to be applied to the animal fibers, can be used. A preliminary test of some selected alkalizing agent can be made to note its compatibility with the dye or to introduce possibility of toxicity or injury.

Ammonium hydroxide, because of its freedom from toxicity over a wide concentration range and its economy is an acceptable alkalizing agent. However, there can be used in place of, or together with the ammonia, any other compatible ammonia derivative alkalizing agent such as a lower alkanolamine such as mono-, di-, or triethanolamine, or alkyl amines or alkylenediamines such as monoethylamine, diethylamine, propylamine, dipropylamine or propylenediamine or a heterocyclic amine such as morpholine. Any of these ammonia derivative alkalizing agents, as well as ammonium hydroxide, may be broadly referred to as an "ammonium alkalizant."

Also, as alkalizing agent, any alkaline earth hydroxide, for example, calcium hydroxide or magnesium hydroxide, can be used up to the limit of its water stability and at any concentration that fails to produce a precipitate with any of the components of the composition. The dissolved alkaline earth hydroxides are preferred over the alkali metal hydroxides, such as sodium hydroxide, or potassium hydroxide, or carbonates, such as sodium carbonate and bicarbonate, any of which can also be used so long as their ultimate concentration in the final dyeing composition is below that which might possibly irritate the scalp or injure the hide of the fur pelt.

The quantity of the various ingredients in the dyeing compositions of the invention can vary over a wide range. Illustratively, tinctorially effective quantities of the dyes can vary from less than about 0.01% to greater than about 10% by weight of the aqueous solution. In the dyeing of living human hair the concentration of the dye will preferably vary from about 0.05% to about 5% by weight of the aqueous solution and particularly from about 0.1% to about 3%. The quantity of the alkalizing agent, if employed, can vary over a wide range depending on the dye and particular alkalizing agent employed. Thus, the alkalizing agent can vary from less than about 0.1% to about 5% and preferably from about 0.5% to about 2% by weight of the aqueous solution. The water content of the composition is ordinarily the major constituent and can vary over a wide range depending in large measure on the quantity of other additives. The dyeing compositions can be formulated as solutions, gels, emulsions, dispersions, and the like.

The dyeing compositions of this invention can be prepared by the conventional methods used in the dyeing art. Thus, they can be prepared by dissolving or dispersing the dye in water or the desired concentration. Water miscible organic solvents can be employed in the composition if desired to facilitate solution of the various dye adjuvants. Illustrative of the organic solvents which can be used, there can be mentioned alkyl monohydric alcohols such as those having from 1 to 6 carbon atoms, e.g. ethanol, isopropanol, etc., alkyl dihydric alcohols such as those having from 2 to 6 carbon atoms, e.g. propylene glycol, and various polyhydric alcohols, ketones or esters. The dispersion of the various ingredients can also be facilitated by addition of a detergent or dispersing agent.

The detergent can be an anionic, non-ionic or cationic. Thus the detergent can be a sulfonated alcohol, a sulfonated fatty acid, a fatty alcohol sulfate, a fatty acid sulfate, an alkyl dimethyl benzyl ammonium chloride, a polyoxyethylene fatty acid ester, a fatty acid dialkylol amide, and the like. Illustrative of specific detergents there can be mentioned lauryl sulfate, polyoxyethylene lauryl ether, myristyl sulfate, glyceryl monostearate, sodium salt of palmitic methyl taurine, cetyl pyridinium chloride, lauryl sulfonate, myristyl sulfonate, lauric diethanolamide, polyoxyethylene stearate, stearyl dimethyl benzyl ammonium chloride, and the like. The quantity of detergent can vary from about 0.1% to about 5% and preferably from about 1 to 4% by weight of the composition.

The following examples are illustrative of the invention:

EXAMPLE 1

*Preparation of 4-Amino-3-Nitrophenyl Biguanide*

One hundred and fifty-three grams of 2-nitro-p-phenylene diamine (1.0 mole) and 89 grams of dicyandiamide (1.1 moles) were placed in a vessel charged with 1,200 ml. of water. Eighty-five ml. of hydrochloric acid (sp. gr. 1.18) were also added to the vessel and the mixture heated for two hours at 90° C. to 95° C. A second portion of dicyandiamide, 89 grams (1.1 moles) was added to the reaction mixture and heating was continued at 90° C. to 95° C. for another 4 hours. The pH of the reaction mixture prior to heating was 2.1 and at the end of the second heating period of 4 hours the pH was 4.5. The hot reaction mixture was passed through a filter to remove a small amount of a dark brown residue. The filtrate was cooled to room temperature and alkalized with an excess of caustic. The 4-amino-3-nitrophenyl-biguanide precipitated out of solution as red crystals. The melting point of the product, after recrystallization from methanol, was 185 to 186° C.; and a 1% aqueous solution of this free base showed a pH of 10.4. The monohydrochloric acid salt of this biguanide had a melting point of 225° C. and a 1% aqueous solution of this salt showed a pH of 7.2. The dihydrochloric acid salt had a melting point of 233–235° C. and a 1% aqueous solution of this salt had a pH of 2.05. The dinitrate salt of the biguanide derivative was prepared and had a melting point of 206–207° C. with the 1% aqueous solution showing a pH of 2.4. The free amino group of this biguanide is diazotizable and gives a violet coupling in alkaline solution with Betanaphtol which is completely different from the starting nitro-p-phenylene diamine which couples brown.

EXAMPLE 2

*Preparation of 4(b-Hydroxyethyl)Amino-3-Nitrophenyl-Biguanide*

Nineteen and seven-tenths (19.7) grams (0.1 mole) of 1(b-hydroxyethyl)amino-2-nitro-4-aminobenzene and 17 ml. of hydrochloric acid (sp. gr. 1.18) were dissolved in 500 ml. of water. To this solution there was added 26.7 grams (0.32 mole) of dicyandiamide and the reaction mixture was refluxed for eight hours, after which an additional 13.0 grams (0.15 mole) of dicyandiamide were added to the reaction mixture and refluxing continued for another 4 hours. The reaction mixture was allowed to cool and unreacted dicyandiamide which crystallized from the solution was separated. The purified solution containing the product was concentrated in vacuo to a volume of 100 ml., allowed to cool to room temperature, and then made alkaline by addition of ammonium hydroxide. After the addition of 15.0 grams of sodium chloride to the ammonical solution and cooling to room temperature, the 4-(b-hydroxyethyl)amino-3-nitrophenyl-biguanide crystallized out of solution as fine dark brown crystals, was recovered by filtration, and found to have a melting point of 196° C. A 1% aqueous solution of this biguanide derivative showed a pH of 10.6. The monohydrochloride salt was prepared and found to have a melting point of 151° C. and a 1% aqueous solution of this salt gave a pH of 7.2. The dihydrochloride salt was prepared and found to have a melting point of 205° C. and a 1% aqueous solution of this salt gave a pH of 1.6.

EXAMPLE 3

*Preparation of 4-Methylamino-3-Nitrophenyl-Biguanide*

Sixteen and seven-tenths (16.7) grams (0.1 mole) of 1-methylamino-2-nitro-4-aminobenzene was dissolved in a solution of 500 ml. of water and 17 ml. of concentrated hydrochloric acid (sp. gr. 1.18). Dicyandiamide, 26.7 grams (0.32 mole), was added to the acidic solution and the mixture was refluxed for 8 hours. The hot reaction mixture was passed through a filter to remove a small amount of residue. After cooling the solution to room temperature it was alkalized with an excess of sodium hydroxide. The product separated as red crystals which after recrystallization from methanol had a melting point of 200° C. A 1% aqueous solution of this free base form of the biguanide derivative gave a pH of 10.6. The monohydrochloride salt of this biguanide derivative had a melting point of 239° C. and a 1% aqueous solution of this salt gave a pH of 7.0; whereas the dihydrochloride salt had a melting point of 226° C. and a 1% aqueous solution thereof gave a pH of 1.8.

EXAMPLE 4

The following dyeing composition was prepared by intimately mixing the ingredients:

| Ingredient— | Percent by weight of composition |
|---|---|
| Carbopol 934 (a polycarboxylated vinyl resin manufactured by the B. F. Goodrich Co.) | 1.00 |
| Dodecyl benzene sulfonate | 1.20 |
| Triethanolamine | 3.50 |
| 4-amino-3-nitrophenyl-biguanide | 0.25 |
| Water | 94.05 |

The dyeing composition of Example 4 was poured over both a rough mixture of grey human hair and grey wool and permitted to saturate these keratinaceous materials for 20 minutes at room temperature. Both the human hair and wool were dyed a yellow-orange shade.

EXAMPLE 5

The following dyeing composition was prepared by simply mixing the ingredients at room temperature:

| Ingredient— | Percent by weight of composition |
|---|---|
| 4-(b-hydroxyethyl)amino-3-nitrophenyl-biguanide | 0.25 |
| Carboxymethylcellulose | 1.50 |
| Monoethanolamine | 3.50 |
| Igepal CN-42 (Sodium N-cyclohexyl N-palmitoyl taurate) | 2.00 |
| Cab-O-Sil (colloidal silica) | 1.00 |
| Water | Q.S. |

The composition of Example 5 was employed to dye a rough mixture of grey human hair. Dyeing was performed by immersing the hair in the composition for 20 minutes at room temperature. The hair was dyed a red-orange shade. Wool was similarly treated with the composition and was also dyed a red-orange shade.

EXAMPLE 6

A dyeing composition was prepared by simply mixing the following ingredients at room temperature:

| Ingredient— | Percent by weight of composition |
|---|---|
| 4-methylamino-3-nitrophenyl-biguanide | 0.25 |
| Fatty acid alkanolamides | 4.00 |
| Igepal CN-42 (Sodium N-cyclohexyl N-palmitoyl taurate) | 1.00 |
| Water | 94.75 |

The composition of Example 6 was employed to dye wool and human hair. The dyeing was performed by immersing the keratinaceous fibers in the dyeing composition for 20 minutes at room temperature. Both the human hair and the wool which were originally grey were dyed a red shade.

EXAMPLE 7

*Reduction of N-Methyl 2,4-Dinitroaniline to 1-Methylamino-2-Nitro-4-Aminobenzene*

In a hydrogenation apparatus there were charged 0.5 gram of 5% platinum on charcoal, a mixture of 9.9 grams of pulverized N-methyl-2,4-dinitroaniline in 200 ml. of ethanol (95% ethanol content) and 20 ml. of concentrated (38%) hydrochloric acid. The reaction mixture was heated to 60° C. and held at this temperature while there was introduced into the reaction chamber, with constant shaking, 0.303 gram (0.15 mole) of hydrogen at a pressure of 50 to 40 p.s.i. (over a period of about 30 minutes). After cooling the reaction mixture to room temperature, a mixture of the catalyst and the hydrochloride of the nitroamine product separated as yellow crystals. These crystals were filtered off, dissolved in 50 ml. of hot water and the undissolved catalyst filtered off. The filtrate was cooled and the resulting acid addition salt of 1-methylamino-2-nitro-4-aminobenzene which precipitated out of solution was recovered by filtration. This acid addition salt was subsequently neutralized with ammonia to obtain the base form of the product which had a dark red color.

EXAMPLE 8

*Reduction of N-Ethyl 2,4-Dinitroaniline to 1-Ethylamino-2-Nitro-4-Aminobenzene*

By following the process described in Example 7 there was hydrogenated 22.0 grams (0.1 mole) of N-ethyl 2,4-dinitroaniline by hydrogenating with 0.605 gram of hydrogen (0.3 mole). From the resulting hydrochloride salt of the product, 1-ethylamino-2-nitro-4-aminobenzene, the free base which had a red shade, was prepared by neutralization with sodium carbonate.

EXAMPLE 9

*Reduction of N-(b-Hydroxyethyl) 2,4-Dinitroaniline to 1-(b-Hydroxyethyl)Amino-2-Nitro-4-Aminobenzene*

A glass lined hydrogenation autoclave was charged with 5 grams of 5% platinum on charcoal catalyst, 20 ml. of water, 300 ml. of isopropanol, 113.5 grams (0.5 mole) of N-(2'-hydroxyethyl) 2,4-dinitroaniline and 200 grams of sulfuric acid (50% by weight of $H_2SO_4$). Hydrogen was introduced into the reaction medium at a pressure of 50 p.s.i. and 60° C. After absorption of 1.5 moles of hydrogen, the autoclave was cooled to 25° C. to 20° C. The reaction mixture was filtered. The yellow crystals of the hydrochloride salt of the product which were recovered as a precipitate were crystallized from 1,000 ml. of hot water and then converted with aqueous ammonia to the free base.

EXAMPLE 10

*Preparation of 4-Amino-3-Nitrophenyl-Guanylurea*

There was dissolved 11.85 grams (0.05 mole) of 4-amino-3-nitrophenyl-biguanide in 100 ml. of 20% hydrochloric acid. This solution was boiled for 2 hours. On cooling to room temperature, i.e. about 24° C. and standing for about 12 hours crystals of 4-amino-3-nitrophenyl-guanylurea·HCl were formed and filtered out of the reaction mixture. After recrystallization from methanol the crystalline hydrochloride salt had a melting point of 250° C. to 251° C. The crystals have a metallic brownish yellow color. Analysis: Theory, 30.6% N and 12.91% Cl. Found, 29.2% N and 13.1% Cl. The free base was obtained by adding 5 ml. of a 25% ammonium hydroxide solution to a slurry containing 1 gram of the 4-amino-3-nitrophenyl-guanylurea·HCl in 15 ml. of water. The free base was isolated by filtration, washed with water, dried, and found to have a melting point of 205° C. to 207° C.

The 4-alkylamino and 4-hydroxyalkylamino-3-nitrophenyl guanylurea derivatives can be produced by use of the corresponding biguanide derivatives in the method of Example 10.

Prolonged periods of boiling such as periods of 8 hours or more in 20% hydrochloric acid causes decomposition of the guanylurea derivatives by severing the guanylurea group at the carbon atom nearest the phenyl radical to produce the corresponding nitro-p-phenylene diamine having a primary amino radical meta to the nitro, i.e. the corresponding Formula II compound. Among the cleavage products of such decomposition 1 mole of carbon dioxide and 1 mole of the corresponding Formula II compound were identified per mole of guanylurea derivative. Illustratively boiling 1 mole of 4-amino-3-nitrophenyl-guanylurea in 20% hydrochloric acid for 8 hours gives 1 mole of carbon dioxide and 1 mole of 2-nitroparaphenylene diamine. Following the same procedure the cleavage products of 4-methylamino-3-nitrophenyl-guanylurea comprise 1 mole of carbon dioxide and 1 mole of 1-methylamino-2-nitro-4-aminobenzene.

It is to be understood that the foregoing examples are intended only to illustrate, and in no sense to limit the invention to the specific reactants, reaction conditions, reaction products or manipulative techniques employed therein. The invention can be practiced broadly within the description thereof set forth hereinabove, and it is to be understood that any modifications or equivalents that would occur to one skilled in the art are to be considered as lying within the scope of this invention.

What is claimed is:

1. A compound of the formula:

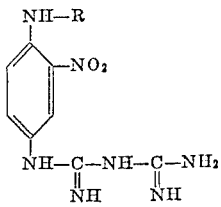

wherein R is lower alkyl.

2. A compound of the formula:

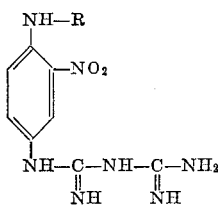

wherein R is lower hydroxyalkyl.

3. A compound of the formula:

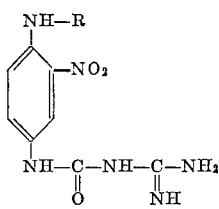

wherein R is lower alkyl.

4. A compound of the formula:

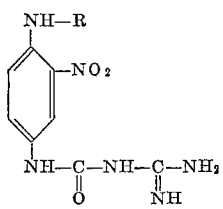

wherein R is lower hydroxyalkyl.

5. The compound of the formula:

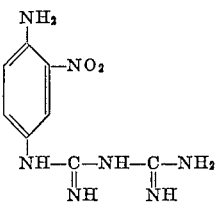

6. The compound of claim 1 wherein R is methyl.
7. The compound of claim 2 wherein R is b-hydroxyethyl.
8. The compound of the formula:

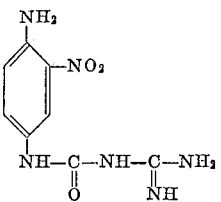

9. The compound of claim 3 wherein R is methyl.
10. The compound of claim 4 wherein R is b-hydroxyethyl.

No references cited.

UNITED STATES PATENT OFFICE
CERTIFICATE OF CORRECTION

Patent No. 3,119,867

January 28, 1964

Hans Z. Lecher et al.

It is hereby certified that error appears in the above numbered patent requiring correction and that the said Letters Patent should read as corrected below.

In the heading to the printed specification, lines 2 and 3, for "AMINO, NITRO-PHENYL-BIGUANIDES AND AMINO, NITRO-PHENYL; GUANYL-UREAS" read -- AMINO-NITRO-PHENYLBIGUANIDES AND AMINO-NITRO-PHENYLGUANYLUREAS --; column 3, line 43, for "Acid hydrolysis of the" should appear as the beginning of a new paragraph; column 6, line 5, column 7, lines 73 and 74, for "b", in italics, each occurrence, read -- $\beta$ --; column 6, lines 9 and 24, column 7, line 6, and column 10, lines 13 and 29, for "b", each occurrence, read -- $\beta$ --.

Signed and sealed this 30th day of June 1964.

(SEAL)
Attest:

ERNEST W. SWIDER

Attesting Officer

EDWARD J. BRENNER

Commissioner of Patents